(12) United States Patent
Kamizono et al.

(10) Patent No.: US 11,787,057 B2
(45) Date of Patent: Oct. 17, 2023

(54) DIAGNOSTIC SYSTEM, DIAGNOSING METHOD, AND PROGRAM

(71) Applicant: Panasonic Intellectual Property Management Co., Ltd., Osaka (JP)

(72) Inventors: Kenta Kamizono, Osaka (JP); Kazutaka Ikeda, Nara (JP); Naofumi Shimasaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 393 days.

(21) Appl. No.: 17/253,548

(22) PCT Filed: May 31, 2019

(86) PCT No.: PCT/JP2019/021703
§ 371 (c)(1),
(2) Date: Dec. 17, 2020

(87) PCT Pub. No.: WO2019/244599
PCT Pub. Date: Dec. 26, 2019

(65) Prior Publication Data
US 2021/0122048 A1 Apr. 29, 2021

(30) Foreign Application Priority Data
Jun. 19, 2018 (JP) ................................. 2018-116458

(51) Int. Cl.
*B25J 9/16* (2006.01)
(52) U.S. Cl.
CPC ............. *B25J 9/1674* (2013.01); *B25J 9/163* (2013.01); *B25J 9/1653* (2013.01)

(58) Field of Classification Search
CPC ......... B25J 9/1674; B25J 9/163; B25J 9/1653
See application file for complete search history.

(56) References Cited

U.S. PATENT DOCUMENTS

| 2002/0186039 A1 | 12/2002 | Devaney et al. |
| 2006/0214645 A1* | 9/2006 | Rufer ........................ H02J 3/38 322/28 |

(Continued)

FOREIGN PATENT DOCUMENTS

| JP | S59-080759 U | 5/1984 |
| JP | 2002-090267 A | 3/2002 |

(Continued)

OTHER PUBLICATIONS

International Search Report issued in corresponding International Patent Application No. PCT/JP2019/021703, dated Aug. 27, 2019, with English translation.

(Continued)

*Primary Examiner* — Jonathan L Sample
*Assistant Examiner* — Mohammed Yousef Abuelhawa
(74) *Attorney, Agent, or Firm* — McDermott Will & Emery LLP

(57) ABSTRACT

A diagnostic system includes an acquirer configured to acquire current waveform data representing a waveform relating to a current supplied to a driving device of an apparatus and a determiner configured to determine a degree of abnormality in the apparatus from a varying portion of the waveform, the varying portion corresponding to a varying time period during which a rotation speed of the driving device increases or decreases.

11 Claims, 5 Drawing Sheets

(56) References Cited

U.S. PATENT DOCUMENTS

| | | | | |
|---|---|---|---|---|
| 2008/0234964 A1* | 9/2008 | Miyasaka | ............. | G01M 13/04 |
| | | | | 702/113 |
| 2012/0009447 A1* | 1/2012 | Ikeda | ................. | H01M 50/505 |
| | | | | 429/90 |
| 2013/0006540 A1* | 1/2013 | Sakaguchi | ............. | F03D 17/00 |
| | | | | 702/34 |
| 2015/0069997 A1* | 3/2015 | Kawahata | ............. | G01R 33/09 |
| | | | | 324/105 |
| 2018/0059656 A1* | 3/2018 | Hiruta | .................. | G01R 31/343 |
| 2018/0264613 A1* | 9/2018 | Tamai | .................. | B23Q 17/007 |
| 2020/0217895 A1* | 7/2020 | Kanemaru | ............ | H02P 29/024 |

FOREIGN PATENT DOCUMENTS

| | | | |
|---|---|---|---|
| JP | 2007-303931 A | | 11/2007 |
| JP | 2008-246831 A | | 10/2008 |
| JP | 2013-104795 A | | 5/2013 |
| JP | 2017-032467 A | | 2/2017 |
| JP | 2017-032567 A | | 2/2017 |
| WO | 2016/143118 A1 | | 9/2016 |
| WO | WO-2019082277 A1 | * | 11/2020 |

OTHER PUBLICATIONS

Japanese Office Action issued in corresponding Japanese Patent Application No. 2020-525436, dated Jun. 6, 2023, with English translation.

* cited by examiner

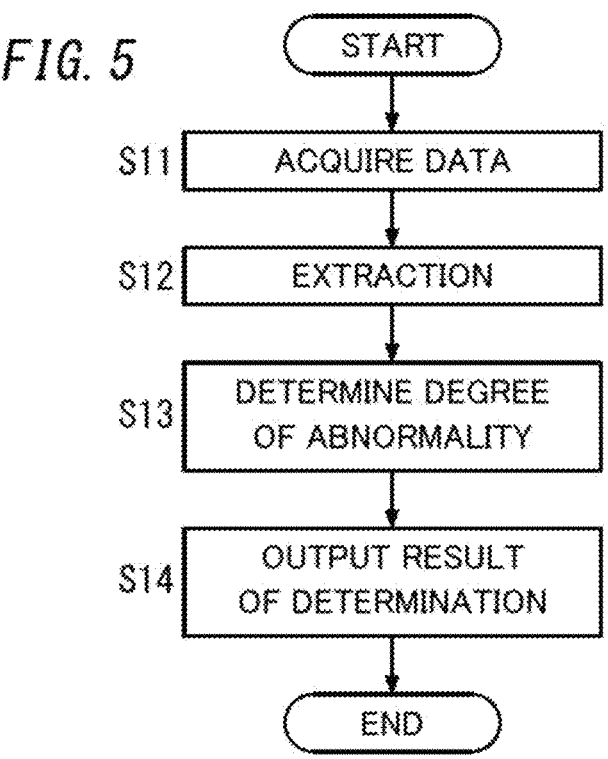

DIAGNOSTIC SYSTEM, DIAGNOSING METHOD, AND PROGRAM

CROSS-REFERENCE OF RELATED APPLICATIONS

This application is the U.S. National Phase under 35 U.S.C. § 371 of International Patent Application No. PCT/JP2019/021703, filed on May 31, 2019, which in turn claims the benefit of Japanese Application No. 2018-116458, filed on Jun. 18, 2018, the entire disclosures of which Applications are incorporated by reference herein.

TECHNICAL FIELD

The present disclosure generally relates to diagnostic systems, diagnosing methods, and programs. The present disclosure specifically relates to a diagnostic system, a diagnosing method, and a program which determine the degree of abnormality in an apparatus.

BACKGROUND ART

Patent Literature 1 discloses an abnormality diagnosing device (diagnostic system) configured to reduce wrong diagnoses of abnormalities caused in a rotation device by age deterioration. A controller of the abnormality diagnosing device of Patent Literature 1 includes a calculation unit for calculating the degree of operation, a threshold setting unit, a vibration measuring unit, a car shaft rotation speed detector, a feature frequency component extractor, and an abnormality diagnosing unit. The calculation unit for calculating the degree of operation calculates the degree of operation which is an index value of an operation time of the rotation device. The threshold setting unit sets, based on the degree of operation, an appropriate diagnosis threshold corresponding to a vibration whose magnitude varies in accordance with the length of the operation time. The vibration measuring unit measures a vibration generated in the rotation device. The car shaft rotation speed detector calculates a car shaft rotation speed based on a vehicle speed. The feature frequency component extractor extracts, from a vibration value of a vibration measured when the car shaft rotation speed is included within a set rotation speed range, a feature frequency component relating to an abnormality in the rotation device. The abnormality diagnosing unit compares the feature frequency component with the diagnosis threshold, and based on a comparison result, the abnormality diagnosing unit diagnoses the abnormality in the rotation device.

In the Patent Literature 1, in order to extract the feature frequency component, the car shaft rotation speed has to be included within the set rotation speed range. That is, in Patent Literature 1, for a diagnosis, the rotation speed of the rotation device (driving device of an apparatus) has to be maintained constant.

CITATION LIST

Patent Literature

Patent Literature 1: JP 2017-32467 A

SUMMARY OF INVENTION

An object is to provide a diagnostic system, a diagnosing method, and a program which are configured to improve the accuracy of determination of an abnormality in an apparatus even when no time period during which the rotation speed of a driving device of the apparatus is maintained constant exists.

A diagnostic system of one aspect of the present disclosure includes an acquirer and a determiner. The acquirer is configured to acquire current waveform data representing a waveform relating to a current supplied to a driving device of an apparatus. The determiner is configured to determine a degree of abnormality in the apparatus from a varying portion of the waveform. The varying portion corresponds to a varying time period during which a rotation speed of the driving device increases or decreases.

A diagnostic system of one aspect of the present disclosure includes an acquirer and an extractor. The determiner is configured to acquire current waveform data representing a waveform relating to a current supplied to a driving device of an apparatus. The extractor is configured to extract a varying portion from the waveform, the varying portion corresponding to a varying time period during which a rotation speed of the driving device increases or decreases.

A diagnosing method of one aspect of the present disclosure includes: acquiring current waveform data representing a waveform relating to a current supplied to a driving device of an apparatus; and determining a degree of abnormality in the apparatus from a varying portion of the waveform, the varying portion corresponding to a varying time period during which a rotation speed of the driving device increases or decreases.

A diagnosing method of one aspect of the present disclosure includes: acquiring current waveform data representing a waveform relating to a current supplied to a driving device of an apparatus; and extracting a varying portion from the waveform. The varying portion is a portion corresponding to a varying time period during which the rotation speed of the driving device increases or decreases.

A program of one aspect of the present disclosure is configured to cause a computer system to execute one of the diagnosing methods.

BRIEF DESCRIPTION OF DRAWINGS

FIG. 5 is a flowchart illustrating operation of the diagnostic system.

DESCRIPTION OF EMBODIMENTS

1. Embodiment

1.1 Schema

Figure 1:
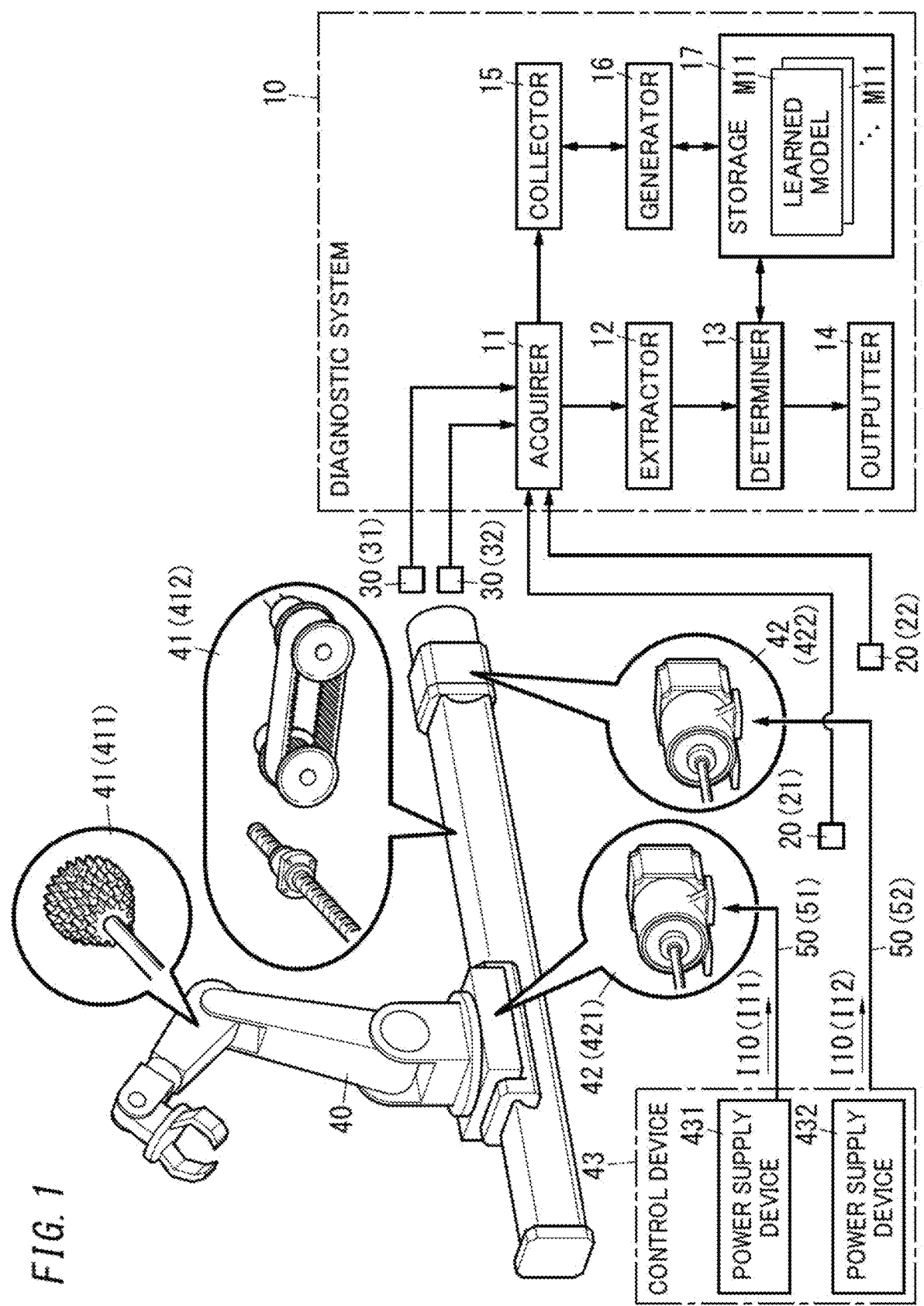
FIG. 1 is a view illustrating a diagnostic system of one embodiment.

FIG. 1 shows a diagnostic system 10 of one embodiment. The diagnostic system 10 includes an acquirer 11 and a determiner 13. The acquirer 11 acquires current waveform data (see FIG. 2) representing a waveform W10 relating to a current I10 (I11, I12) supplied to a driving device 42 (421, 422) of an apparatus 40. The determiner 13 determines the degree of abnormality in the apparatus 40 from varying portions Wc1 and Wc2 of the waveform W10. The varying portions Wc1 and Wc2 respectively correspond to varying time periods Tc1 and Tc2 during which the rotation speed of the driving device 42 increases or decreases.

A correlation was found between the degree of abnormality in the apparatus 40 and the varying portions Wc1 and Wc2 of the waveform W10. The varying portions Wc1 and Wc2 respectively correspond to the varying time periods Tc1 and Tc2 during which the rotation speed of the driving device 42 increases or decreases. The diagnostic system 10 determines the degree of abnormality in the apparatus 40 by using the varying time periods Tc1 and Tc2 but not a time period (a stable period Ts), during which the rotation speed of the driving device 42 is maintained constant, of the waveform W10. Thus, even when the time period (the stable period Ts) during which the rotation speed of the driving device 42 of the apparatus 40 is maintained constant does not exist, the accuracy of determination of the degree of abnormality in the apparatus 40 is improved.

1.2 Configuration

The diagnostic system 10 will be described further in detail. The diagnostic system 10 is used to make a diagnosis for the apparatus 40 as illustrated in FIG. 1.

The apparatus 40 is, for example, a working apparatus. The working apparatus is an apparatus configured to execute a prescribed process. Examples of the prescribed process include transportation. Examples of such a working apparatus include transport machines such as SCARA robots, delivery robots (e.g., linear guides and orthogonal robots). FIG. 1 shows, as a transport machine, the apparatus 40 including a SCARA robot and a linear guide configured to move the SCARA robot. Note that the prescribed process is not limited to the transportation but may be, for example, a process, a disposition, and a packaging of materials and/or goods. The process may include, for example, physical processes such as boring, hole cutting, tapping, cutting, and polishing, and chemical processes such as heating and cooling. Such a working apparatus may be a mechanical tool such as a turning machine, an electronic component packaging machine, a transport machine, a thermal process device, an industrial robot, or a combination thereof. Note that the industrial robot is not limited to the delivery robot but may be a welding robot, an assembling robot, a painting robot, an inspection robot, a polishing robot, or a cleaning robot.

As illustrated in FIG. 1, the apparatus 40 includes a mechanism 41 (411, 412), the driving device 42 (421, 422), and a control device 43.

The mechanism 41 (411, 412) is a device configured to execute a prescribed process. The mechanism 41 is a device configured to transport a material or an item. The mechanism 41 includes power transmission components such as a ball screw, a gear, and a belt. As an example, the mechanism 411 includes a gear of the SCARA robot, and the mechanism 412 includes at least one of a ball screw or a belt of the linear guide. Note that in FIG. 1, only part of the mechanism 41 is shown, and this is only to simplify the description, and actually, the mechanism 41 may include more power transmission components.

The driving device 42 (421, 422) is a device configured to drive the mechanism 41 (411, 412). In other words, the driving device 42 is a power source of the mechanism 41. The rotation speed of the driving device 42 varies in accordance with a current supplied to the driving device 42. In the present embodiment, the driving device 42 is a motor (e.g., a rotary motor or a direct-acting motor). The driving device 42 includes an alternating current motor. The alternating current motor may be a servomotor, a synchronization motor, a three-phase induction motor, or a single phase induction motor. Specifically, the rotation speed per unit time of the driving device 42 varies in accordance with a variation of a basic frequency of the alternate current supplied to the driving device 42. For example, as the basic frequency increases, the rotation speed increases, and as the basic frequency decreases, the rotation speed decreases. The driving device 42 serves as a vibration source in the apparatus 40. Note that in FIG. 1, only two driving devices 42 are shown, and this is only to simplify the description, and actually, an increased number of driving devices 42 may exist.

The control device 43 is a device configured to control the driving device 42. The control device 43 includes power supply devices 431 and 432. The power supply devices 431 and 432 respectively supply the current I10 (I11, I12) to the driving device 42 (421, 422). The power supply devices 431 and 432 are connected to the driving device 42 (421, 422) via an electric wire 50 (51,52). In the present embodiment, the driving devices 421 and 422 are alternating current motors, and the currents I11 and I12 are alternating currents having basic frequencies. The power supply devices 431 and 432 have a function of adjusting the basic frequencies of the currents I11 and I12. Since the power supply devices 431 and 432 are realizable by conventionally known AC power supply circuits, the detailed description thereof is omitted.

As illustrated in FIG. 1, the diagnostic system 10 includes current measuring units 21 and 22 and vibration measuring units 31 and 32.

The current measuring units 21 and 22 measure the currents I11 and I12 respectively supplied to the driving devices 421 and 422 of the apparatus 40 and output current waveform data (current waveform data) representing waveforms relating to the currents I11 and I12. The current measuring units 21 and 22 are attached to the electric wires 51 and 52 through which the currents I11 and I12 from the power supply devices 431 and 432 to the driving devices 421 and 422. The current measuring units 21 and 22 include current sensors. In the present embodiment, the current measuring units 21 and 22 include differential type current sensors. Thus, the current waveform data is data of differential waveforms of the currents I11 and I12. Examples of such differential type current sensors include coreless type sensors (e.g., search coils). At the search coils, an induction voltage according to a magnetic flux generated by the current I10 flowing through the electric wire 50 is generated, and therefore, measuring of the current I10 becomes possible. Here, the induction voltage of the search coil is given by the following formula (1). In the formula (1), e is the induction voltage, r is the radius of the search coil, n is the number of turns of the search coil, and B is the magnetic flux density of a magnetic field interlinked with the search coil.

[Formula 1]

$$e = -n\pi r^2 \frac{\partial B}{\partial t} \qquad (1)$$

Using such a differential type current sensor enables the current measuring units 21 and 22 to be attached to the electric wires 51 and 52 later.

The vibration measuring units 31 and 32 are used to measure vibrations that do not appear in the rotation (rotation of a rotor) by the driving device 42. The vibration measuring units 31 and 32 output waveform data (vibration waveform data) representing waveforms relating to such vibrations. In particular, the vibration measuring unit 31 is disposed at a site where the vibration measuring unit 31 can measure vibrations relating to the mechanism 411 and the driving device 421. Moreover, the vibration measuring unit 32 is disposed at a site where the vibration measuring unit 32 can measure vibrations relating to the mechanism 412 and the driving device 422. The vibration measuring units 31 and 32 include vibration sensors. As the vibration sensors, conventionally known vibration sensors may be used. The vibration measuring units 31 and 32 are disposed at prescribed sites in the apparatus 40. The prescribed sites are accordingly selected in accordance with an abnormality in the apparatus 40 on which determination is to be made by the diagnostic system 10. The method itself of determining the abnormality based on a vibration acquired from a cantilever or the like may be a conventionally known method, and therefore, the detailed description thereof is omitted. Moreover, AI may be used for determination of an abnormality.

As illustrated in FIG. 1, the diagnostic system 10 includes the acquirer 11, an extractor 12, the determiner 13, an outputter 14, a collector 15, a generator 16, and storage 17.

The acquirer 11 acquires waveform data (current waveform data) representing waveforms relating to the currents I11 and I12 respectively supplied to the plurality of driving devices 421 and 422 of the apparatus 40. Specifically, the acquirer 11 is connected to the current measuring unit 21 and the current measuring unit 22 and individually acquires current waveform data from the current measuring unit 21 and the current measuring unit 22. The current waveform data from the current measuring unit 21 is data representing the differential waveform of the current I11, and the current waveform data from the current measuring unit 22 is data representing the differential waveform of the current I12. The acquirer 11 further acquires the waveform data (the vibration waveform data) representing a waveform relating to a vibration generated at the apparatus 40. Specifically, the acquirer 11 is connected to the vibration measuring unit 31 and the vibration measuring unit 32 and individually acquires vibration waveform data from the vibration measuring unit 31 and the vibration measuring unit 32.

Figure 2:
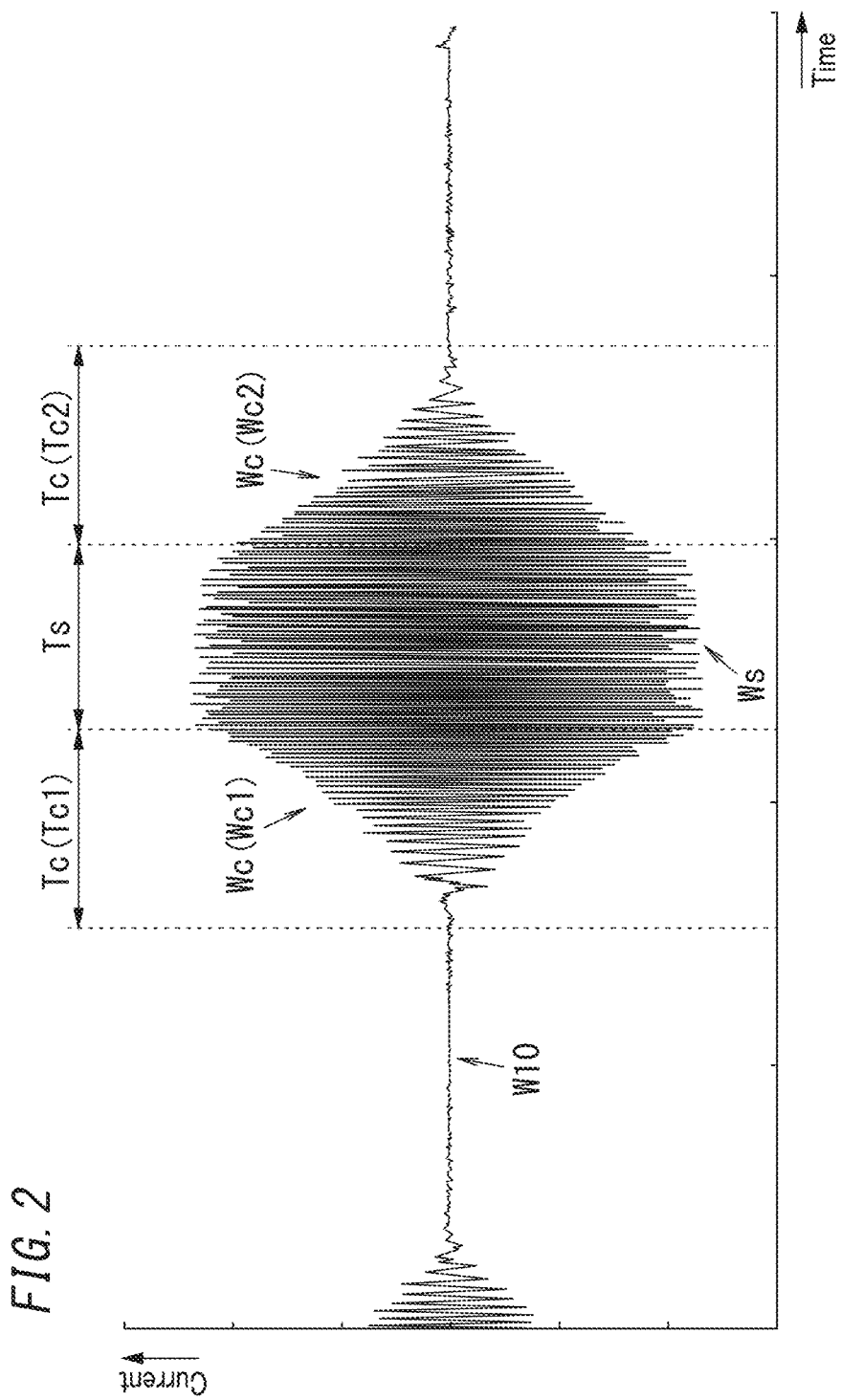
FIG. 2 is a view illustrating a waveform relating to a current supplied to a driving device of an apparatus.

The extractor 12 extracts a varying portion Wc (Wc1, Wc2) from the waveform W10 represented by the current waveform data acquired by the acquirer 11 (see FIG. 2). The varying portion Wc (Wc1, Wc2) is a portion of the waveform W10, the portion corresponding to a varying time period Tc (Tc1, Tc2) during which the rotation speed of the driving device 42 increases or decreases. In particular, the extractor 12 identifies whether the varying portion Wc is the first varying portion Wc1 or the second varying portion Wc2. The first varying portion Wc1 is a portion of the waveform W10, the portion corresponding to a varying time period (a first varying time period) Tc1 during which the rotation speed of the driving device 42 increases. The second varying portion Wc2 is a portion of the waveform W10, the portion corresponding to a varying time period (a second varying time period) Tc2 during which the rotation speed of the driving device 42 decreases. As described above, the extractor 12 extracts the varying portion Wc from the waveform W10 and does not extract a stable portion Ws. The stable portion Ws is a portion of the waveform W10, the portion corresponding to the stable period Ts during which the rotation speed of the driving device 42 is maintained constant. The extractor 12 extracts the varying portion Wc for each of the current waveform data from the current measuring unit 21 and the current waveform data of the current measuring unit 22. In some cases, however, the varying portion Wc is not included depending on situations.

Figure 3:
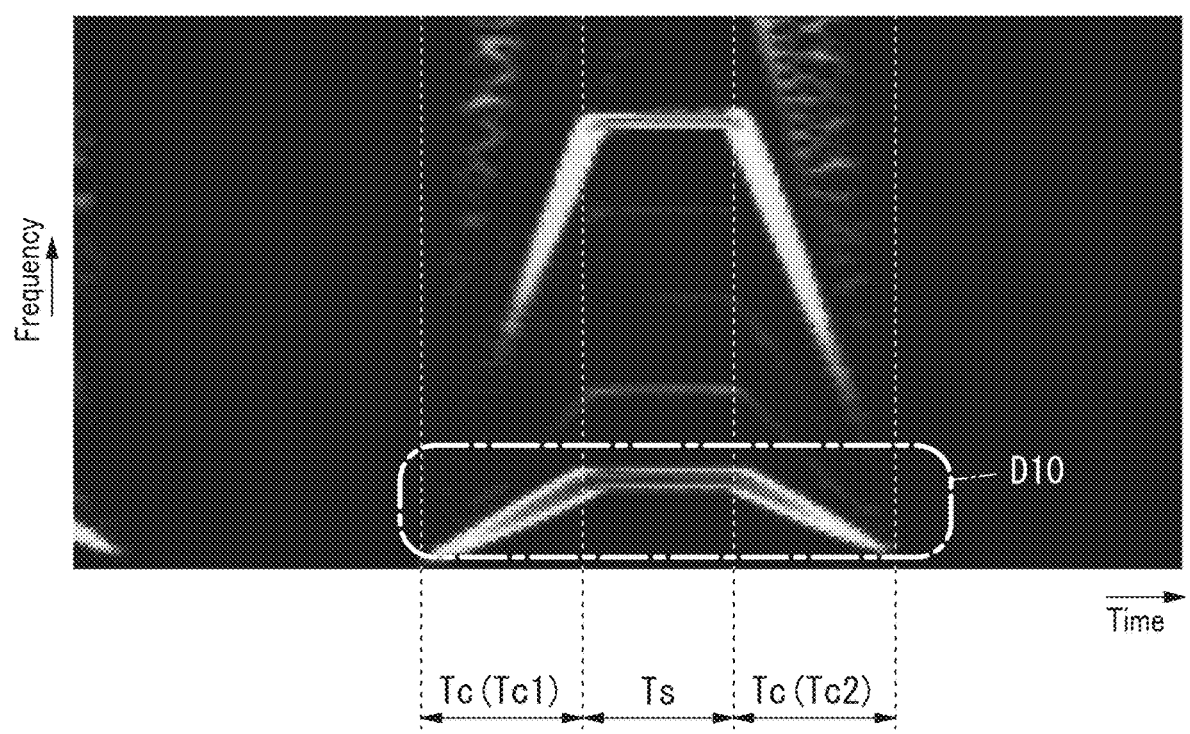
FIG. 3 is a view illustrating an analysis result of the waveform of FIG. 2.

In the present embodiment, the extractor 12 performs short-time Fourier transform (STFT) on the waveform W10 to extract the varying portion Wc from the waveform W10. FIG. 3 shows a result of short time Fourier transform performed on the waveform W10. In FIG. 3, the abscissa shows the time, the ordinate shows the frequency, and color shades show amplitudes. As the color becomes darker, the amplitude increases. In FIG. 3, a distribution D10 in an area in which the frequency is low corresponds to the basic frequency. In the distribution D10, a time period during which the frequency increases with respect to the time is the first varying time period Tc1. Moreover, a time period during which the frequency decreases with respect to the time is the second varying time period Tc2. Moreover, a time period during which the frequency is constant with respect to the time is the stable period Tc1. When the result of the short time Fourier transform performed on the waveform W10 is used, the first varying time period Tc1, the second varying time period Tc2, and the stable period Ts are easily identified. The extractor 12 determines the first varying time period Tc1 and the second varying time period Tc2 based on the result of the short time Fourier transform performed on the waveform W10. The extractor 12 extracts the varying portion Wc (Wc1, Wc2) from the waveform W10 based on the first varying time period Tc1 and the second varying time period Tc2.

Moreover, the extractor 12 extracts, from a waveform represented by the vibration waveform data acquired by the acquirer 11, a stable portion corresponding to the stable period Ts. The extractor 12 extracts the stable portion from each of the vibration waveform data from the vibration measuring unit 31 and the vibration waveform data from the vibration measuring unit 32. In some cases, however, the stable portion is not included depending on situations.

In the present embodiment, as described above, when the basic frequency of the current I10 increases, the rotation speed of the driving device 42 increases, and when the basic frequency of the current I10 decreases, the rotation speed of the apparatus 40 decreases. Therefore, the extractor 12 extracts the varying portion Wc and the stable portion Ws from the waveform W10 based on a temporary variation of the basic frequency of the current I10. The extractor 12 analyzes the frequency of the current waveform data acquired by the acquirer 11 by the Fourier transform or the like and specifies the varying time period Tc (Tc1, Tc2) and the stable period Ts from the temporal variation of the frequency. The extractor 12 then extracts the varying portion Wc and the stable portion Ws from the waveform W10 based on the varying time period Tc (Tc1, Tc2) and the stable period Ts.

Figure 4:
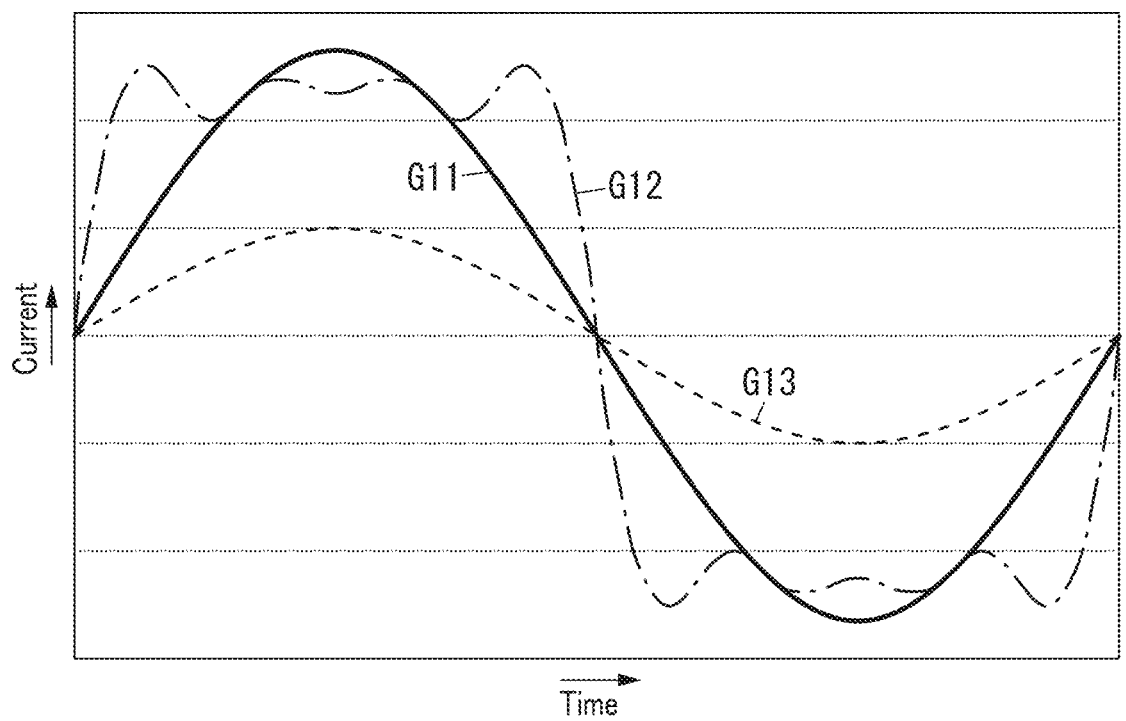
FIG. 4 is a view illustrating a waveform relating to a current supplied to a driving device of an apparatus.

The determiner 13 determines the degree of abnormality in the apparatus 40 from varying portions Wc1 and Wc2 of the waveform W10. The varying portions Wc1 and Wc2 respectively correspond to varying time periods Tc1 and Tc2 during which the rotation speed of the driving device 42 increases or decreases. In the present embodiment it is assumed that when the apparatus 40 is in a stable state, the current I10 supplied to the driving device 42 has a sine wave form shown by G11 in FIG. 4. When the apparatus 40 has an abnormality, the waveform is disturbed as shown by G12 in FIG. 4, or the amplitude of the waveform decreases as shown by G13. That is, it was found that any variation occurs in the waveform when the apparatus 40 has an abnormality. It is assumed that a correlation relationship exists between the waveform of the current I10 supplied to the driving device 42 and the degree of abnormality in the apparatus 40. The degree of abnormality in the apparatus 40 may be represented by, for example, two steps, that is, the presence and absence of the abnormality. Moreover, the degree of abnormality in the apparatus 40 may include a plurality of types of abnormalities such as a damage on and/or wear of the mechanism 41. For example, the degree of abnormality may be represented by a three or more steps, that is, no abnormality (normal), damaged, severely worn, intermediately worn, and slightly worn.

The determiner 13 determines the degree of abnormality in the apparatus 40 from the varying portion Wc by using the learned model M11. Here, the learned model M11 is designed such that an abnormality value is output in response to a received input (the varying portion Wc). The determiner 13 gives the varying portion Wc obtained from the extractor 12 to the learned model M11 to obtain a value from the learned model M11, and based on the value thus obtained, the determiner 13 determines the degree of abnormality. For example, when the degree of abnormality is the presence or absence of the abnormality, the learned model M11 can be generated by unsupervised learning in which the varying portion Wc when the apparatus 40 is normal is used as learning data (training index). For example, when the degree of abnormality includes multiple steps including the types of the abnormality, the learned model M11 can be generated by supervised learning which adopts learning data (data set) specifying the relationship between a label corresponding to the degree of abnormality and the varying portion Wc. The learned model M11 is stored in the storage 17. In the present embodiment, the storage 17 stores a plurality of learned models M11 corresponding to respective types of mechanisms 41 connectable to the driving device 42. That is, the storage 17 stores respective learned models M11 corresponding to the mechanisms 411 and 412. In this case, the learned model M11 serving as a reference may be generated, and derivative models may be generated from the reference, and thereby, the plurality of types of learned models M11 may be obtained.

The determiner 13 determines the degree of abnormality in the apparatus 40 from the varying portion Wc by using a learned model M11 of the plurality of learned models M11 which corresponds to the mechanism 41 connected to the driving device 42. As described above, the apparatus 40 includes the mechanisms 411 and 412, and the degree of abnormality in the apparatus 40 may include the degree of abnormality in the mechanism 411 and the degree of abnormality in the mechanism 412. The determiner 13 uses the learned model M11 corresponding to the mechanism 411 for current waveform data (i.e., current waveform data of the current I11 supplied to the driving device 421 that drives the mechanism 411) from the current measuring unit 21 corresponding to the mechanism 411. Moreover, the determiner 13 uses the learned model M11 corresponding to the mechanism 412 for current waveform data (i.e., current waveform data of the current I12 supplied to the driving device 422 that drives the mechanism 412) from the current measuring unit 22. Thus, the determiner 13 determines the degree of abnormality in the mechanism 41 by using the learned model M11 associated with the mechanism 41. Thus, the accuracy of determination on the degree of abnormality in the apparatus 40 is improved.

Moreover, the determiner 13 may determine the degree of abnormality in the apparatus 40 from a stable portion of the waveform represented by the vibration waveform data, the stable portion corresponding to the stable period Ts during which the rotation speed of the driving device 42 is maintained constant. As an example, the determiner 13 may determine the degree of abnormality in the apparatus 40 by a conventionally known method based on mechanical vibration engineering. That is, the determiner 13 may use determination of an abnormality in the apparatus 40 based on the vibration waveform data in addition to determination of an abnormality in the apparatus 40 based on the current waveform data. Thus, the degree of abnormality in the apparatus 40 can be determined from two types of parameters, namely, a current and a vibration. Thus, the accuracy of determination on the degree of abnormality in the apparatus 40 is improved. Note that the determiner 13 may use the learned model also for the vibration waveform data in a similar manner to the current waveform data.

Here, the vibration during operation of one of the driving devices 42 may influence measurement by the vibration measuring unit 32 relating to the other of the driving device 42 but has substantially no influence over measurement by the current measuring unit 22. Thus, it is confirmed that unlike the vibration waveform data of the vibration measuring units 31 and 32, the pieces of current waveform data of the current measuring units 21 and 22 are less likely influenced by each other. Thus, when a plurality of driving devices 42 serving as the vibration sources are provided as in the case of the apparatus 40 of the present embodiment, the determination of the abnormality based on the current waveform data tends to have higher accuracy than the determination of the abnormality based on the vibration waveform data.

The outputter 14 outputs a determination result by the determiner 13. The outputter 14 includes, for example, an audio output device and a display. The display is, for example, a thin display device such as a liquid crystal display or an organic EL display. The outputter 14 may display the determination result by the determiner 13 on the display or may report the determination result by an audio output device. Moreover, the outputter 14 may transmit or accumulate the determination result by the determiner 13 as data to or in an external device. Note that the outputter 14 does not have to include both the audio output device and the display.

The collector 15 collects and accumulates data acquired by the acquirer 11. In the present embodiment, data acquired by the acquirer 11 includes the pieces of current waveform data from the current measuring unit 21 and the current measuring unit 22. The data collected by the collector 15 is used to generate and/or improve the learned model M11.

The generator 16 generates the learned model M11 to be used by the determiner 13. The generator 16 generates the learned model M11 by machine learning algorithm based on a certain amount or more of learning data. The learning data may be prepared in advance or may be generated from data accumulated by the collector 15. When the learning data generated from data accumulated by the collector 15 is adopted, further improvement of the accuracy of determination of an abnormality based on the learned model M11 can be expected. The generator 16 evaluates the learned model M11 newly generated, and when the evaluation of the learned model M11 is improved, the generator 16 replaces the learned model M11 stored in the storage 17 with the learned model M11 newly generated, thereby updating the learned model M11. As a method for generating the learned model M11, unsupervised learning or supervised learning may accordingly be used depending on the contents of the degree of abnormality as described above. Note that as the unsupervised learning, a typical dimensional compression methodology such as an autoencoder may be used. Moreover, as the supervised learning, a typical Convolutional Neural Network (CNN) or the like may be used.

In the diagnostic system 10, the acquirer 11, the extractor 12, the determiner 13, the outputter 14, the collector 15, and the generator 16 may be realized by, for example, a computer system including one or more processors (e.g., microprocessors) and one or more memories. That is, the one or more processors execute one or more programs stored in the one or more memories, thereby realizing functions as the acquirer 11, the extractor 12, the determiner 13, the outputter 14, the collector 15, and the generator 16. The one or more programs may be stored in the memory in advance, provided via a telecommunications network such as the Internet, or provided by a non-transitory storage medium such as a memory card storing the program.

1.3 Operation

Next, basic operation of the diagnostic system 10 will be briefly described with reference to FIG. 5. To simplify the description, a diagnosis of the mechanism 411 of the apparatus 40 will be described below.

The diagnostic system 10 acquires, by the acquirer 11, the waveform data (the current waveform data) representing a waveform relating to a current I11 supplied to the driving device 421 of the apparatus 40 (S11). The diagnostic system 10 then extracts, by the extractor 12, the varying portion Wc (Wc1, Wc2) from the waveform W10 represented by the current waveform data acquired by the acquirer 11 (S12). The diagnostic system 10 thereafter determines, by the determiner 13, the degree of abnormality in the apparatus 40 from the varying portion Wc by using a learned model M11 of the plurality of learned models M11 which corresponds to the mechanism 411 connected to the driving device 421 (S13). Finally, the diagnostic system 10 outputs, by the outputter 14, the determination result by the determiner 13 (S14). As described above, the diagnostic system 10 make a diagnosis for the mechanism 411 driven by the driving device 421 from waveform data representing a waveform relating to the current I11 supplied to the driving device 421 and presents a result of the determination.

1.4 Summary

The diagnostic system 10 described above includes the acquirer 11 and the determiner 13. The acquirer 11 is configured to acquire current waveform data representing the waveform W10 relating to the current I10 supplied to the driving device 42 of the apparatus 40. The determiner 13 is configured to determine the degree of abnormality in the apparatus 40 from the varying portion Wc of the waveform W10. The varying portion Wc corresponds to the varying time period Tc during which the rotation speed of the driving device 42 increases or decreases. With the diagnostic system 10, even when no time period during which the rotation speed of a driving device 42 of the apparatus 40 is maintained constant exists, the accuracy of determination of the degree of abnormality in the apparatus 40 is improved.

In other words, the diagnostic system 10 executes a diagnosing method (a first diagnosing method) described below. The first diagnosing method includes acquiring waveform W10 data representing the waveform W10 relating to the current I10 supplied to the driving device 42 of the apparatus 40. The diagnosing method further includes determining the degree of abnormality in the apparatus 40 from the varying portion Wc of the waveform W10. The varying portion Wc corresponds to the varying time period Tc during which the rotation speed of the driving device 42 increases or decreases. With the first diagnosing method, even when no time period during which the rotation speed of a driving device 42 of the apparatus 40 is maintained constant exists, the accuracy of determination of the degree of abnormality in the apparatus 40 is improved.

The diagnostic system 10 is realized by a computer system. That is, the diagnostic system 10 is realized by a computer system executing a program (a diagnostic program). This program is a program for causing the computer system to execute the first diagnosing method. With this program, in a similar manner to the first diagnosing method, even when no time period during which the rotation speed of a driving device 42 of the apparatus 40 is maintained constant exists, the accuracy of determination of the degree of abnormality in the apparatus 40 is improved.

According to another aspect, the diagnostic system 10 includes the acquirer 11 and the extractor 12. The acquirer 11 is configured to acquire current waveform data representing the waveform W10 relating to the current I10 supplied to the driving device 42 of the apparatus 40. The extractor 12 is configured to extract the varying portion Wc from the waveform W10. The varying portion Wc corresponds to the varying time period Tc during which the rotation speed of the driving device 42 increases or decreases. The diagnostic system 10 improves the accuracy of determination of the degree of abnormality in the apparatus 40 even when no time period during which the rotation speed of a driving device 42 of the apparatus 40 is maintained constant exists.

In other words, the diagnostic system 10 executes a diagnosing method (a second diagnosing method) described below. The second diagnosing method includes acquiring current waveform data representing the waveform W10 relating to the current I10 supplied to the driving device 42 of the apparatus 40. The diagnosing method extracts the varying portion Wc from the waveform W10. The varying portion Wc corresponds to the varying time period Tc during which the rotation speed of the driving device 42 increases or decreases. With the second diagnosing method, even when no time period during which the rotation speed of a driving device 42 of the apparatus 40 is maintained constant exists, the accuracy of determination of the degree of abnormality in the apparatus 40 is improved.

The diagnostic system 10 is realized by a computer system. That is, the diagnostic system 10 is realized by a computer system executing a program (a diagnostic program). This program is a program for causing the computer system to execute the second diagnosing method. With this program, in a similar manner to the second diagnosing method, even when no time period during which the rotation speed of a driving device 42 of the apparatus 40 is maintained constant exists, the accuracy of determination of the degree of abnormality in the apparatus 40 is improved.

2. Variation

The embodiment of the present disclosure is not limited to the above-described embodiment. Various modifications may be made to the above-described embodiment depending on design and the like as long as the object of the present disclosure can be achieved. Variations of the above-described embodiment will be described below.

For example, the diagnostic system 10 does not necessarily have to include the current measuring unit 20 (21, 22) or the vibration measuring uni 30 (31, 32). For example, as long as the current measuring unit 20 (21, 22) is provided in advance to the apparatus 40, the diagnostic system 10 includes at least the acquirer 11, the extractor 12, the determiner 13, the outputter 14, the collector 15, the generator 16, and the storage 17. The same applies to the vibration measuring uni 30 (31, 32).

Here, the current measuring unit 20 does not necessarily have to include the differential type current sensor but may be another conventionally known current sensor. Moreover, the vibration measuring uni 30 is not essential. That is, the diagnostic system 10 does not have to have a function of making a diagnosis by using the vibration waveform data. In other words, the diagnostic system 10 includes at least a function of determining the degree of abnormality in the apparatus 40 from the current waveform data.

Moreover, the diagnostic system 10 does not have to have a function of making a diagnosis by using the vibration waveform data. That is, the diagnostic system 10 includes at least a function of determining the degree of abnormality in the apparatus 40 from the current waveform data.

Moreover, the diagnostic system 10 does not necessarily have to include the collector 15, the generator 16, or the storage 17. That is, the diagnostic system 10 does not have to have a function of updating the learned model M11 by itself. Moreover, the storage 17 does not necessarily have to store a plurality of learned models M11.

Moreover, the extractor 12 may extract the stable portion Ws in addition to the varying portion Wc. That is, the extractor 12 may extract, from the waveform W10, the varying portion Wc and the stable portion Ws corresponding to the stable period Ts during which the rotation speed of the driving device 42 is maintained constant. In this case, the stable portion Ws may be auxiliary used for determination of an abnormality as necessary. Moreover, the extractor 12 is not essential. For example, when the process by the extractor 12 is performed by a user, the diagnostic system 10 does not have to extract the varying portion Wc. Moreover, the degree of abnormality may be obtained as an output from a learned model M11 with the entirety of the waveform W10 represented by the current waveform data acquired by the acquirer 11 as an input. That is, extraction of the varying portion Wc may be omitted.

Moreover, the determiner 13 is not essential. For example, when the process by the determiner 13 is performed by a user, the diagnostic system 10 at least presents the varying portion Wc to the user.

Moreover, the diagnostic system 10 does not necessarily have to include the outputter 14. For example, the diagnostic system 10 may be configured to output the degree of abnormality determined by the determiner 13 to the outside of the diagnostic system 10.

Moreover, the diagnostic system 10 may include a plurality of computers, and the functions (in particular, the acquirer 11, the extractor 12, the determiner 13, the outputter 14, the collector 15, and the generator 16) of the diagnostic system 10 may be distributed to a plurality of devices. For example, the acquirer 11, the extractor 12, the determiner 13, and the outputter 14 may be provided to a personal computer or the like disposed in a facility including the apparatus 40, and the generator 16 and the outputter 14 may be disposed in the external server or the like. In this case, the personal computer and the server cooperate to realize the diagnostic system 10. Moreover, at least some of the functions of the diagnostic system 10 may be realized by, for example, the cloud (cloud computing).

An execution subject of the diagnostic system 10 described above includes a computer system. The computer system includes a processor and memory as hardware. The functions as the execution subject of the diagnostic system 10 according to the present disclosure may be realized by making the processor execute a program stored in the memory of the computer system. The program may be stored in the memory of the computer system in advance or may be provided over a telecommunications network. Alternatively, the program may also be distributed after having been recorded in some non-transitory storage medium such as a memory card, an optical disc, or a hard disk drive, any of which is readable by the computer system. The processor of the computer system includes one or more electronic circuits including a semiconductor integrated circuit (IC) or a large-scale integrated circuit (LSI). A field programmable gate array (FGPA), or an application specific integrated circuit (ASIC), programmable after the manufacturing of an LSI or a reconfigurable logical device that can realize reconfiguration of a connection relationship in the interior of an LSI or setup of a circuit section in the interior of the LSI may also be used for the same purpose. The plurality of electronic circuits may be collected on one chip or may be distributed on a plurality of chips. The plurality of chips may be integrated together in a single device or distributed in multiple devices without limitation.

3. Aspects

As can be clearly seen from the embodiment and variations described above, the present disclosure includes the aspects described below. In the following description, reference signs in parentheses are provided merely to clarify the correspondence relationship to the embodiment.

A diagnostic system (10) of the first aspect includes an acquirer (11) and a determiner (13). The acquirer (11) is configured to acquire current waveform data representing a waveform (W10) relating to a current (I10) supplied to a driving device (42) of an apparatus (40). The determiner (13) is configured to determine a degree of abnormality in the apparatus (40) from a varying portion of the waveform (W10). The varying portion (Wc) corresponds to a varying time period (Tc) period during which a rotation speed of the driving device (42) increases or decreases. With the first aspect, even when no time period during which the rotation speed of a driving device (42) of the apparatus (40) is maintained constant exists, the accuracy of determination of the degree of abnormality in the apparatus (40) is improved.

A diagnostic system (10) of a second aspect would be realized in combination with the first aspect. In the second aspect, the diagnostic system (10) further includes an extractor (12) configured to extract the varying portion (Wc) from the waveform (W10). With the second aspect, even when no time period during which the rotation speed of a driving device (42) of the apparatus (40) is maintained constant exists, the accuracy of determination of the degree of abnormality in the apparatus (40) is improved.

A diagnostic system (10) of a third aspect would be realized in combination with the second aspect. In the third aspect, the extractor (12) is configured to identify whether the varying portion (Wc) is a first varying portion (Wc1) or a second varying portion (Wc2). The first varying portion (Wc1) is a portion of the waveform (W10), the portion corresponding to a first varying time period (Tc1) during which the rotation speed of the driving device (42) increases. The second varying portion is a portion of the waveform, the portion corresponding to a second varying time period (Tc2) during which the rotation speed of the driving device decreases. With the third aspect, even when no time period during which the rotation speed of a driving device (42) of the apparatus (40) is maintained constant exists, the accuracy of determination of the degree of abnormality in the apparatus (40) is improved.

A diagnostic system (10) of a fourth aspect would be realized in combination with the third aspect. In the fourth aspect, the current (I10) is an alternating current having a basic frequency. The extractor (12) is configured to extract the varying portion (Wc) and a stable portion (Ws) from the waveform (W10) based on a temporal variation of the basic frequency. According to the fourth aspect, the accuracy of extraction of the varying portion (Wc) is improved.

A diagnostic system (10) of a fifth aspect would be realized in combination with any one of the first to fourth aspects. The diagnostic system of the fifth aspect further includes a current measuring unit (20) configured to measure the current (I10) and output the current waveform data. The current measuring unit (20) includes a differentia-type current sensor. With the fifth aspect, even when no time period during which the rotation speed of a driving device (42) of the apparatus (40) is maintained constant exists, the accuracy of determination of the degree of abnormality in the apparatus (40) is improved.

A diagnostic system (10) of a sixth aspect would be realized in combination with the fifth aspect. In the sixth aspect, the current (I10) measuring unit (20) is configured to be attached to an electric wire (50) through which the current (I10) flows. According to the sixth aspect, packaging of the diagnostic system (10) is facilitated.

A diagnostic system (10) of a seventh aspect would be realized in combination with any one of the first to sixth aspects. In the seventh aspect, the apparatus (40) includes a working apparatus (40). The seventh aspect enables a diagnosis to be made for the working apparatus.

A diagnostic system (10) of an eighth aspect would be realized in combination with any one of the first to seventh aspects. In the eighth aspect, the apparatus (40) includes a vibration source (42). According to the eighth aspect, the current waveform data is less likely to be influenced by a vibration. Therefore, the accuracy of determination of the degree of abnormality in the apparatus (40) is suppressed from being degraded due to the presence of the vibration source (42).

A diagnostic system (10) of a ninth aspect would be realized in combination with any one of the first to eighth aspects. In the ninth aspect, the apparatus (40) includes a plurality of the driving devices (42). The acquirer (11) is configured to acquire respective pieces of current waveform data of the plurality of driving devices (42). According to the ninth aspect, the pieces of current waveform data are less likely to be influenced by each other. Therefore, the accuracy of determination of the degree of abnormality in the apparatus (40) is suppressed from being degraded due to the presence of the plurality of driving devices (42).

A diagnostic system (10) of a tenth aspect would be realized in combination with any one of the first to ninth aspects. In the tenth aspect, the determiner (13) is configured to determine the degree of abnormality in the apparatus (40) from the varying portion (Wc) by using a learned model (M11). According to the tenth aspect, a variation that occurs when the apparatus (40) has an abnormality is to be learned, and thus, the accuracy of determination of the degree of abnormality in the apparatus (40) is further improved.

A diagnostic system (10) of an eleventh aspect would be realized in combination with the tenth aspect. In the eleventh aspect, the diagnostic system (10) further includes storage (17) configured to store a plurality of the learned models (M11) corresponding to respective types of mechanisms (41) connectable to the driving device (42). The determiner (13) is configured to determine the degree of abnormality in the apparatus (40) from the varying portion (Wc) by using a learned model (M11) of the plurality of learned models (M11) which corresponds to the mechanism (41) connected to the driving device (42). According to the eleventh aspect, a learned model (M11) suitable to the apparatus (40) is used, and thus, the accuracy of determination of the degree of abnormality in the apparatus (40) is further improved.

A diagnostic system (10) of a twelfth aspect includes an acquirer (11) and an extractor (12). The acquirer (11) is configured to acquire current waveform data representing a waveform (W10) relating to a current (I10) supplied to a driving device (42) of an apparatus (40). The extractor (12) is configured to extract a varying portion (Wc) from the waveform (W10). The varying portion (Wc) corresponds to a varying time period (Tc) during which a rotation speed of the driving device (42) increases or decreases. With the twelfth aspect, even when no time period during which the rotation speed of a driving device (42) of the apparatus (40) is maintained constant exists, the accuracy of determination of the degree of abnormality in the apparatus (40) is improved.

A diagnosing method of a thirteenth aspect includes acquiring current waveform data representing a waveform (W10) relating to a current (I10) supplied to a driving device (42) of an apparatus (40). The diagnosing method includes determining a degree of abnormality in the apparatus (40) from a varying portion of the waveform (W10). The varying portion (Wc) corresponds to a varying time period (Tc) period during which a rotation speed of the driving device (42) increases or decreases. With the thirteenth aspect, even when no time period during which the rotation speed of a driving device (42) of the apparatus (40) is maintained constant exists, the accuracy of determination of the degree of abnormality in the apparatus (40) is improved.

A diagnosing method of a fourteenth aspect includes acquiring current waveform data representing a waveform (W10) relating to a current (I10) supplied to a driving device (42) of an apparatus (40). The diagnosing method included extracting a varying portion (Wc) from the waveform (W10), the varying portion corresponding to a varying time period during which a rotation speed of the driving device (42) increases or decreases. With the fourteenth aspect, even when no time period during which the rotation speed of a driving device (42) of the apparatus (40) is maintained constant exists, the accuracy of determination of the degree of abnormality in the apparatus (40) is improved.

A program of a fifteenth aspect is configured to cause a computer system to execute the diagnosing method of the thirteenth or fourteenth aspect. With the fifteenth aspect, even when no time period during which the rotation speed of a driving device (42) of the apparatus (40) is maintained constant exists, the accuracy of determination of the degree of abnormality in the apparatus (40) is improved.

REFERENCE SIGNS LIST

10 DIAGNOSTIC SYSTEM
11 ACQUIRER
12 EXTRACTOR
13 DETERMINER
20 CURRENT MEASURING UNIT
40 APPARATUS
42 DRIVING DEVICE
50 ELECTRIC WIRE

I10 CURRENT
W10 WAVEFORM
Wc VARYING PORTION
Wc1 FIRST VARYING PORTION
Wc2 SECOND VARYING PORTION
Ws STABLE PORTION
Tc VARYING TIME PERIOD
Tc1 FIRST VARYING TIME PERIOD
Tc2 SECOND VARYING TIME PERIOD
Ts STABLE PERIOD
M11 LEARNED MODEL

The invention claimed is:

1. A diagnostic system comprising:
an acquirer configured to acquire current waveform data representing a waveform relating to a current supplied to a driving device of an apparatus;
a storage storing a plurality of learned models corresponding to respective types of mechanisms connectable to the driving device; and
a determiner configured to determine a degree of abnormality in the apparatus from a varying portion of the waveform by using a learned model of the plurality of learned models which corresponds to a mechanism connected to the driving device, the varying portion of the waveform relating to the current supplied to the driving device corresponding to a varying time period during which a rotation speed of the driving device increases or decreases.

2. The diagnostic system of claim 1, further comprising an extractor configured to extract the varying portion from the waveform.

3. The diagnostic system of claim 2, wherein
the extractor is configured to identify whether the varying portion is a first varying portion or a second varying portion,
the first varying portion is a portion of the waveform, the portion corresponding to a first varying time period during which the rotation speed of the driving device increases, and
the second varying portion is a portion of the waveform, the portion corresponding to a second varying time period during which the rotation speed of the driving device decreases.

4. The diagnostic system of claim 3, wherein
the current is an alternating current having a basic frequency, and
the extractor is configured to extract the varying portion and a stable portion from the waveform based on a temporal variation of the basic frequency.

5. The diagnostic system of claim 1, further comprising a current measuring unit configured to measure the current and output the current waveform data, wherein
the current measuring unit includes a differential-type current sensor.

6. The diagnostic system of claim 5, wherein
the current measuring unit is configured to be attached to an electric wire through which the current flows.

7. The diagnostic system of claim 1, wherein
the apparatus includes a working apparatus.

8. The diagnostic system of claim 1, wherein
the apparatus includes a vibration source.

9. The diagnostic system of claim 1, wherein
the apparatus includes a plurality of the driving devices, and
the acquirer is configured to acquire respective pieces of current waveform data of the plurality of driving devices.

10. A diagnosing method, comprising:
acquiring current waveform data representing a waveform relating to a current supplied to a driving device of an apparatus; and
determining a degree of abnormality in the apparatus from a varying portion of the waveform by using a learned model of a plurality of learned models which corresponds to a mechanism connected to the driving device, the plurality of learned models corresponding to respective types of mechanisms connectable to the driving device and being stored in a storage, the varying portion of the waveform relating to the current supplied to the driving device corresponding to a varying time period during which a rotation speed of the driving device increases or decreases.

11. A non-transitory storage medium storing a program configured to cause a computer system to execute:
acquiring current waveform data representing a waveform relating to a current supplied to a driving device of an apparatus; and
determining a degree of abnormality in the apparatus from a varying portion of the waveform by using a learned model of a plurality of learned models which corresponds to a mechanism connected to the driving device, the plurality of learned models corresponding to respective types of mechanisms connectable to the driving device and being stored in a storage, the varying portion of the waveform relating to the current supplied to the driving device corresponding to a varying time period during which a rotation speed of the driving device increases or decreases.

\* \* \* \* \*